Oct. 6, 1931.  S. W. FULLERTON  1,826,389
ILLUMINATING DEVICE
Filed Feb. 6, 1929  2 Sheets-Sheet 1
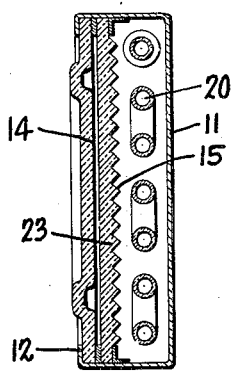
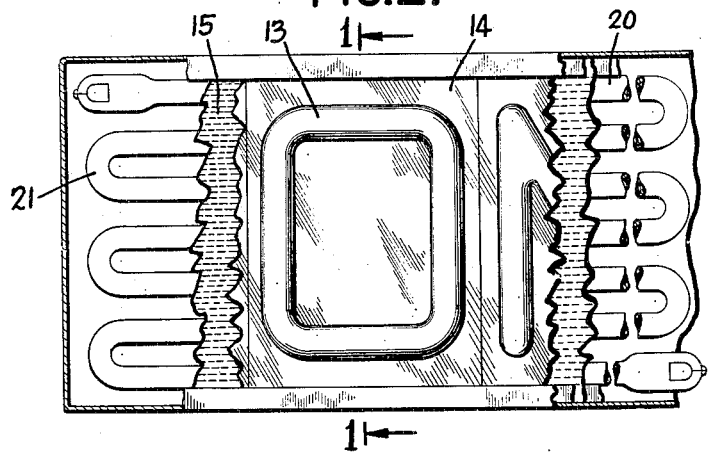
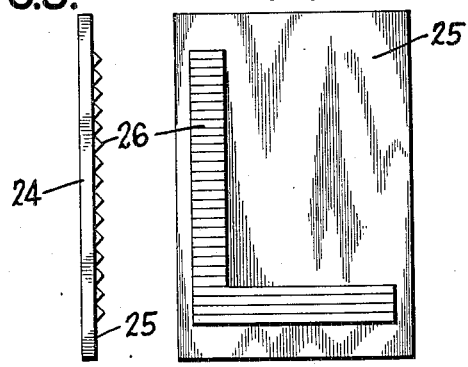
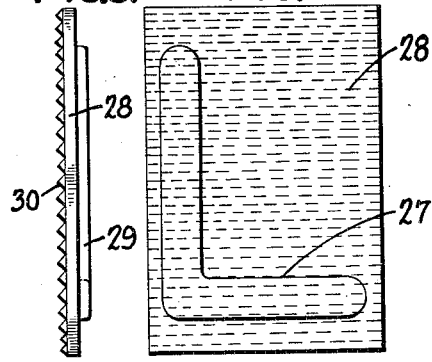
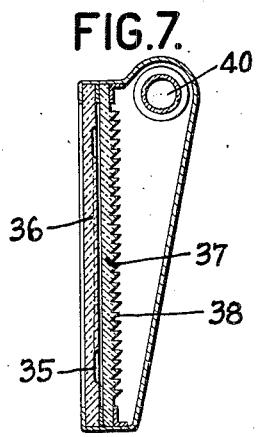
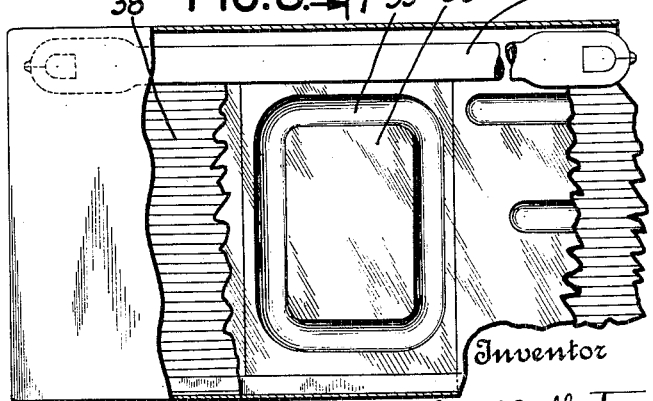

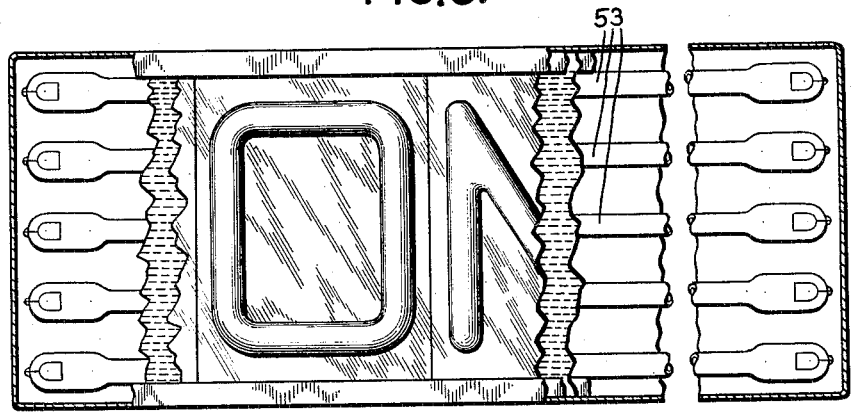

Patented Oct. 6, 1931

1,826,389

UNITED STATES PATENT OFFICE

STEPHEN W. FULLERTON, OF FLUSHING, NEW YORK, ASSIGNOR TO CLAUDE NEON LIGHTS, INC., OF NEW YORK, N. Y., A CORPORATION OF NEW YORK

ILLUMINATING DEVICE

Application filed February 6, 1929. Serial No. 337,805.

This invention relates to an illuminating device of the kind in which transparent letters, designs or other indicia are illuminated from a source of light immediately therebehind.

The primary object of the present invention is the utilization of a discharge tube light as the source of light to illuminate transparent letters or other indicia carried with an opaque background and preferably to distribute the light evenly over the surface of said indicia. According to one aspect of the invention, a discharge tube is reversely bent in the form of a grid to obtain an even distribution of light over a relatively large area. According to another aspect, a plurality of preferably parallel tube lights is utilized to form the grid.

The invention also seeks to prevent the form of the discharge tube being visible through the transparent letters. To this end, diffusing means is associated with the transparent indicia. In one modification of the invention a diffusing glass formed with prismatic ribs is utilized, the ribs extending parallel to the axes of the coiled discharge tube or of the parallel tubes.

Another object of the invention has to do with the simplification of the structure of an illuminating device of this character. Accordingly, the diffusing ribs, in one aspect of the invention, may be formed directly on the transparent portion of the illuminating device. In another aspect of the invention the transparent indicia may be relatively opaque or translucent, as, for instance a milk glass, to effect the diffusion.

Still another object of the invention is the provision of an illuminated device in which an unbent discharge tube is utilized. Accordingly a diffusing medium is provided with a prismatic formation adapted to reflect the light through the indicia from an unbent discharge tube thereabove and extending preferably in parallel relationship therewith. In one aspect, letters, designs or other indicia may be etched upon the inner face of a ground glass surface parallel to and in front of the said diffusing medium.

These and other objects of the invention and the means for their attainment will be more apparent from the following detailed description, taken in connection with the accompanying drawings illustrating various modifications by which the invention may be realized, and in which:

Figure 1 is a view in transverse vertical section on the line 1—1 of Figure 2 and shows an illuminating device in which a grid-like discharge tube is used.

Figure 2 shows a front elevation of the illuminating device, parts being removed in the interest of the clearness.

Figure 3 is a view in end elevation of a symbol capable of use with the illuminating device of this invention and being a modification of the structure shown in Figures 1 and 2.

Figure 4 shows the symbol of Figure 3 in front elevation, that is the ribs are on the outside surface of the letter.

Figures 5 and 6 are views similar to Figures 3 and 4 but showing a modified form of the symbol.

Figure 7 is a view in transverse vertical section showing a modified illuminating device in which an unbent discharge tube is utilized.

Figure 8 is a view in front elevation of the device shown in Figure 7, parts being removed in the interest of clearness.

Figure 9 is a view similar to Figure 2 but showing a series of parallel straight discharge tube lights in place of the single grid-like tube.

Figures 10 and 11 are views in front elevation and in vertical cross section respectively, showing a pressed out translucent letter carried with a metallic or other opaque plate as a background, the letter being conveniently formed of a milk glass.

Figures 12 and 13 illustrate in front elevation and vertical cross section respectively, a pressed-out letter for insertion in a metal plate as in Figures 10 and 11, the diffusing ribs being formed on the concave portion.

Referring first to Figures 1 and 2, an illuminating device is illustrated comprising a chamber or casing 11 having an open side 12. Within the open side 12 transparent letters, designs or other indicia are adapted to be disposed and to be illuminated by a source of light within the chamber 11. For convenience, such indicia, no matter how formed, or upon what background, will be designated a screen. In the illustrated embodiment these transparent indicia are illustrated as letters 13 formed upon or carried with an opaque background 14, each background 14 being preferably rectangular and carrying but a single one of the indicia, say a letter, so that a plurality of plates 14 may be assembled to form or spell the desired word. Such indicia 13 may conveniently be formed by molding a sheet of glass 14 with the desired indicia 13 say, by pressing the indicia out of the sheet as seen in Figure 1, and making all of the sheet but the indicia 13 opaque, say, by a suitable coating, as is well understood in the art. Or the plate, as in Figures 10 to 13, at 50 and 57 may be of metal or other opaque substance, cut out in the form of the indicia and a transparent indicia 51, such as a glass letter, inserted therein as in Figures 10 and 11.

The source of light in this illuminating device is a discharge tube light 20 which is preferably coiled in the form of a grid by reversely bending the tube as at 21 to the form shown in Figure 2. Of course, the grid may comprise several coiled tubes or, as shown in Figure 9, a plurality of straight discharge tube lights 53, forming a series of parallel tubes in the same plane and that parallel to the screen, may be used.

Discharge tubes are well known and one such tube comprises a transparent envelope filled, preferably, with an inert gas, such as neon, helium, argon and others of the same group or mixtures thereof. This gas is caused to emit light by the passage therethrough, between spaced electrodes, of a high tension alternating current. Various colors of emitted light may be realized by a mixture of the gases alone or with mercury vapor. By forming the discharge tube as a grid or using a series of parallel tube lights to form the grid, the light therefrom is conveniently distributed over the entire surface of the indicia 13, and in order to prevent a striated effect due to the parallel portions of the discharge tube being visible through the indicia 13, a diffusing medium 23 may be interposed between the indicia 13 and the discharge tube 20. This diffusing element 23 may take the form of a sheet of glass of the desired characteristics having a series of ribs 15 upon one face, preferably that facing the discharge tube, the ribs 15 extending in a direction parallel to that of the axes of the coils.

Instead of using separate sheets 14 and 23 for the respective letters 13 and ribs 15, a plate 24, may have all of one surface opaque as at 25 with the exception of that portion forming the indicia. In Figures 3 and 4 the letter "L" is formed and on one side, as at 26, the diffusing ribs may be formed, covering only the transparent portion of the plate 24. The diffusing ribs may be on either the outside or the inside surface of the letter.

In the modification illustrated in Figures 5 and 6 the plate 28 which forms the background and upon which the indicia 29 is molded has formed on its opposite face a plurality of diffusing ribs 30 extending thereacross. Here again, either surface may bear the ribs 30.

It is sometimes convenient to form the opaque plate 50 (Figures 10 and 11) of metal or other substance and cut out a portion thereof, as at 55, and insert therein semi-opaque or translucent indicia as at 51 and suitably secure the same in place. Such translucent indicia may be formed of a milk glass or the equivalent. As the translucency is increased the diffusion of such an indicia is increased and thus any desired degree of diffusion of the light rays may be attained by a proper selection of the translucent material of which the indicia is formed. Further, the closer a more opaque indicia is brought to the source of light the better the diffusion. On the other hand as the opaqueness of the indicia approaches complete transparency, diffusing ribs or prisms must be resorted to.

These diffusing ribs may be directly formed as at 56 on either face of a molded transparent indicia 57 (Figures 12 and 13) provided with flanges 58 so that the indicia can be inserted in the metal plate 50.

A further modification of the invention is illustrated in Figures 7 and 8. Here the indicia 35 may, if desired, be formed by etching letters or other symbols on the inner face of a sheet of ground glass 36. Immediately proximate the etched side of the ground glass 36, a diffusing medium 37 may be disposed having a series of preferably horizontally extending prismatic ribs 38 so formed that light from a straight discharge tube 40 disposed above the horizontal plane of the indicia will be reflected through the ground glass 36 to the eye of an observer. Obviously transparent letters such as 13 on an opaque background 14 may be substituted for the etched ground glass 36.

It will thus be seen that an illuminated device is provided wherein the letters or symbols are illuminated from a source of light therewithin while the source of illumination, instead of comprising a plurality of incandescent lamps, may take the form of a discharge tube light which is not visible through the transparent symbols.

Various modifications will occur to those skilled in the art in the disposition, composition and configuration of the transparent indicia or screen, as well as in the diffusing medium and the light source and no limitations are intended by the phraseology of the foregoing description or illustrations in the accompanying drawings except as indicated in the appended claims.

What I claim is:—

1. In an illuminating device, in combination, a casing having an open side, a screen disposed across the open side, a discharge tube grid within the casing and adapted to illuminate the screen and diffusing means between the discharge tube and the screen formed with ribs parallel to the axes of the tube.

2. A screen for an illuminating device comprising a background plate, a solid raised symbol moulded on said background plate, diffusing ribs formed on the other face of said background plate, said background plate, with the exception of the symbol, being opaque.

In testimony whereof I affix my signature.

STEPHEN W. FULLERTON.